United States Patent [19]

Vittorelli

[11] Patent Number: 4,703,504

[45] Date of Patent: Oct. 27, 1987

[54] METHOD AND APPARATUS FOR THE PHONETIC RECOGNITION OF WORDS

[75] Inventor: Vittore Vittorelli, Ivrea, Italy

[73] Assignee: Ing. C. Olivetti & C., S.p.A., Ivrea, Italy

[21] Appl. No.: 549,656

[22] Filed: Nov. 8, 1983

[30] Foreign Application Priority Data

Nov. 8, 1982 [IT] Italy .............................. 68302 A/82

[51] Int. Cl.$^4$ ............................................. G10L 1/00
[52] U.S. Cl. ................................................... 381/51
[58] Field of Search .................... 381/41, 42, 43, 44, 381/45, 48, 51; 364/513.5

[56] References Cited

U.S. PATENT DOCUMENTS

| | | | |
|---|---|---|---|
| 3,265,814 | 11/1964 | Kenichi et al. | 381/44 |
| 3,483,941 | 1/1968 | Brady | 73/647 |
| 3,553,372 | 5/1971 | Wright | 381/43 |
| 4,015,087 | 3/1977 | Stewart | 381/48 |
| 4,084,245 | 4/1978 | Bunge | 364/485 |
| 4,181,813 | 1/1980 | Marley | 381/44 |
| 4,326,101 | 4/1982 | Sakoe | 364/513.5 |
| 4,348,553 | 9/1982 | Baker et al. | 364/513.5 |
| 4,349,700 | 9/1982 | Pirz et al. | 364/513.5 |

OTHER PUBLICATIONS

Flanagan, J. L. *Speech Analysis Synthesis and Perception*, 1972 pp. 341 (QP 306.F57).

Primary Examiner—Gareth D. Shaw
Assistant Examiner—John G. Mills
Attorney, Agent, or Firm—Banner, Birch, McKie & Beckett

[57] ABSTRACT

The method consists in analyzing phonemes of the phonetic signal at regular intervals of time, comparing the phonemes with a series of reference phonemes, selecting the reference phoneme closest to the phoneme of the phonetic signal and generating a visible indication of the selected phoneme in real time on a monitor (20) to allow the speaker to adapt his speech to the response of the apparatus.

The apparatus comprises a series of analyzers ($A_1$, $A_2$ . . . $A_n$) for a phonetic signal segment for generating a series of vectors (V) to be compared by a set (13) of comparators ($C_1$, $C_2$ . . . $C_m$) with a plurality of reference vectors corresponding to the various reference phonemes.

A control unit (19) receiving the result of the comparison controls the visual display on the monitor (20) of a histogram indicating the selected phoneme and also a merit value (P) and a stability value (ST), of the recognition.

A lexical recognition unit (22) is adapted to link individual phonemes together to recognize words and to display the words on the monitor (20).

6 Claims, 3 Drawing Figures

METHOD AND APPARATUS FOR THE PHONETIC RECOGNITION OF WORDS

BACKGROUND OF THE INVENTION

The present invention relates to a method and the corresponding apparatus for the phonetic recognition of words spoken by a speaker, in which the speech is analysed periodically to obtain at least one vector to be compared with a plurality of vectors of reference phonemes and to select the phoneme most similar to the speech portion analysed.

Known types of apparatus for the recognition of words presuppose the cooperation of the speaker: in "speaker-dependent" types, recognition is based on comparison of the voice with words or with phonemes prerecorded by the same speaker, as samples or models. The sound is recognised when it is judged sufficiently close to one of the model words or phonemes. Consequently, the speaker is required to produce sounds similar, as far as possible, to the samples used for comparison.

In other systems, termed "speaker-independent", the speaker is required to conform to certain ways of pronunciation which are less precisely defined. This request may amount to a request to speak with "sufficient clarity".

In either case, in the event of lack of recognition, the speaker does not know the cause thereof and, consequently, he can only repeat the operation blindly, hoping for a better result. With experience, the user sometimes learns fortuitously to know the response of the machine and, gradually, the error rate decreases.

SUMMARY OF THE INVENTION

The object of the invention is to produce a method of recognition and recognition apparatus capable of reacting to sounds in very short spaces of time, producing a reaction for the speaker to allow him to control his own voice in such manner as to obtain the best performances. The natural process of learning about the response of the machine will therefore be facilitated.

The method according to the invention for the phonetic recognition of words, is characterised by the generation in real time of a visible indication corresponding to the selected phoneme whereby the speaker may adapt his pronunciation to accord with the pronunciation corresponding to the reference phonemes. The corresponding apparatus comprises means for converting speech signals into digital form, analysis means for analysing the converted speech signals for generating at least one corresponding vector, means for comparing the vector so generated with each of the plurality of vectors of reference phonemes, and recognition means responsive to the output of the comparison means to recognise the reference phoneme most similar to the phoneme analysed, characterised by control means for generating in real time a visible display of the recognised phoneme.

A preferred embodiment of the invention will be described by way of example, with referene to the accompanying drawings, in which:

DESCRIPTION OF THE PREFERRED EMBODIMENT

Figure 1:
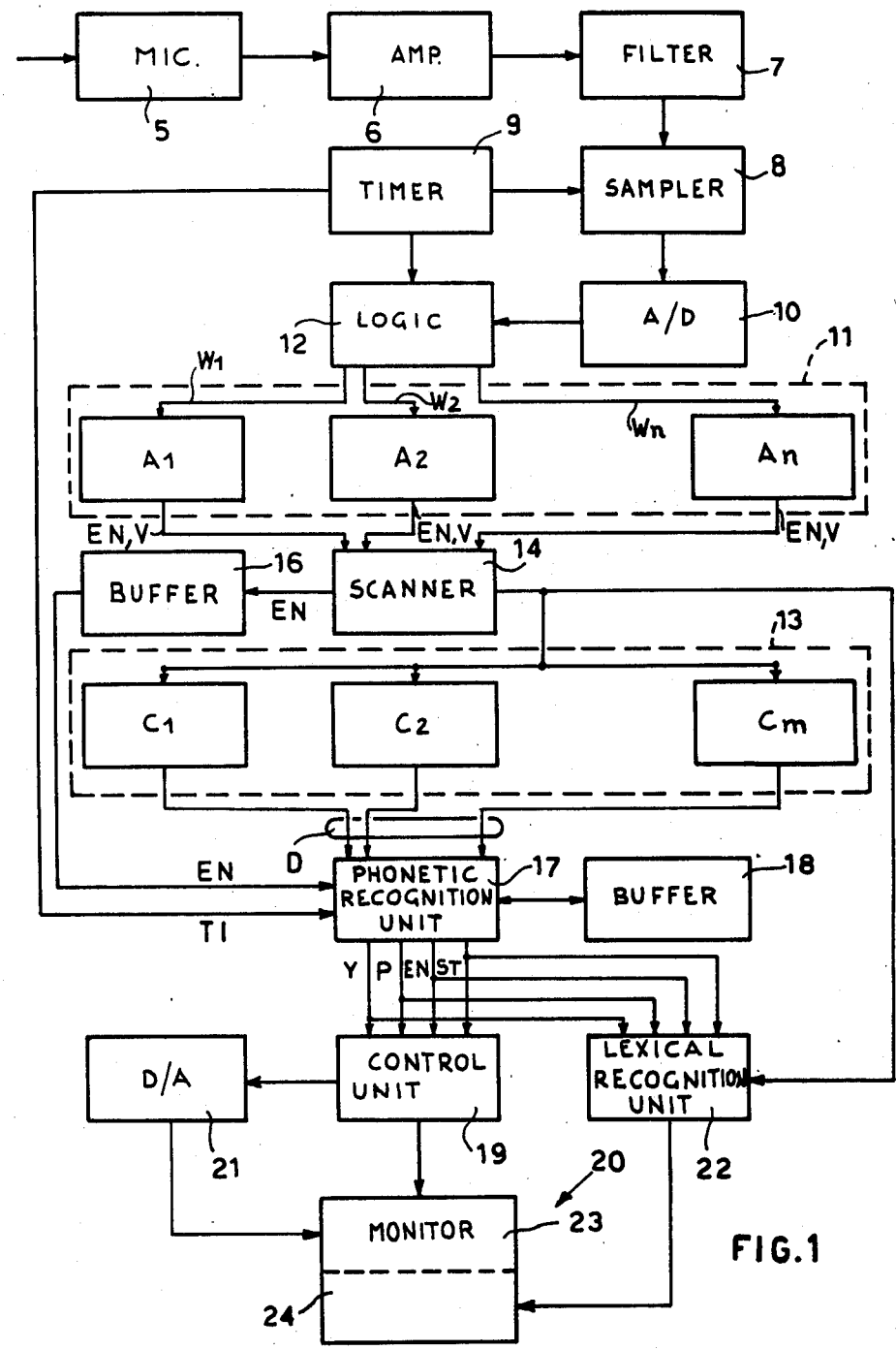
FIG. 1 is a block diagram of apparatus according to the invention for the phonetic recognition of words.

The recognition apparatus comprises a microphone 5 adapted to pick up continuously the voice signal of a speaker, and to send it to an amplifier 6. The amplified signal then passes through a series of band-pass or anti-aliasing filters 7 to eliminate the undesired frequencies which could distort the sampling which follows. Such frequencies can be found, for example, on the basis of the algorithm described in paragraph 2.4.1 of the book by Lawrence R Rabiner and Ronald W Schafer entitled "Digital Processing of Speech Signals", published by Prentice-Hall, Inc, Englewood Cliffs, N.J.

The apparatus further comprises a sampling unit 8 which is controlled by a timer 9 for sampling on the basis of the aforesaid algorithm the signal coming from the filters 7 with a predetermined frequency, for example between 12 and 20 KHz.

The signals sampled in this way are converted by an analogue-to-digital converter 10.

Figure 2:
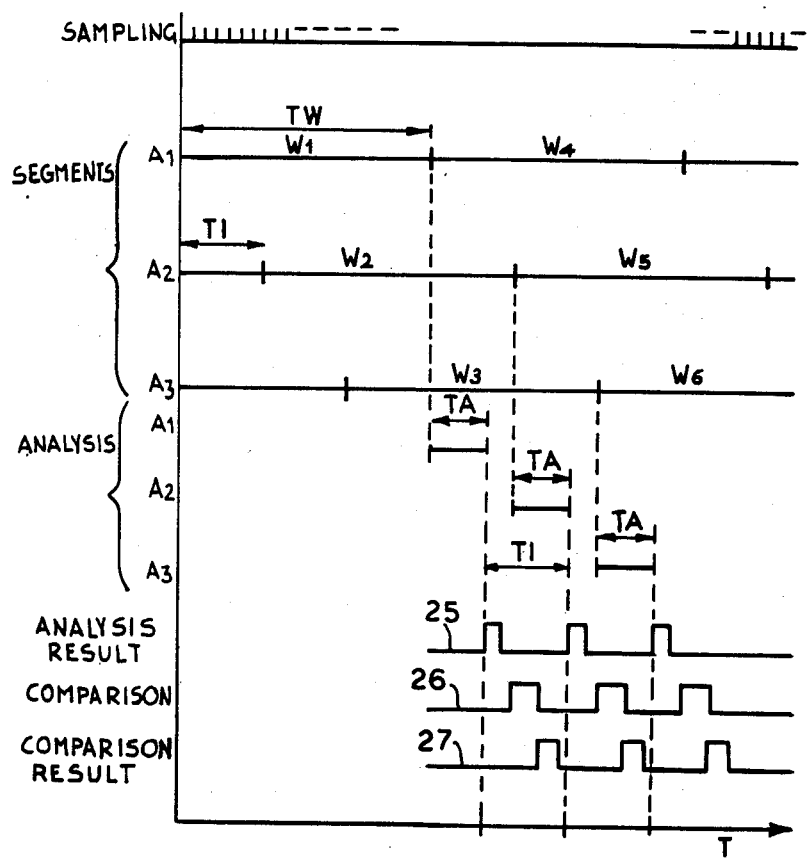
FIG. 2 is a timing diagram of the operation of the apparatus of FIG. 1.

An analysis unit 11 is adapted to analyse the phonetic signals issuing from the converter 10 to produce at least one vector V corresponding to the phonetic signal. The analysis unit comprises a series of analysers $A_1, A_2 \ldots A_n$ each adapted to analyse signals supplied by the converter 10 in a predetermined period of time TW (FIG. 2).

The analysers $A_1 \ldots A_n$ analyse at each operation a window or segment W of signals, producing a corresponding vector V (FIG. 1) which contains the coefficients of reflection Ki, that is, the analytical representation of the voice or vocal segment W analysed. The algorithm of such an analytical definition of the segment is described, for example, in paragraph 4.2.1 of the book by J. D. Markel and A. H. Gray, Jr, entitled "Linear Prediction of Speech", published by Springer Verlag, New York. The number of coefficients Ki may be chosen between 12 and 18 and, as is well-known, is correlated to the sampling frequency. The analysers $A_1 \ldots A_n$ moreover are adapted to generate in a known manner a value EN representing the average power of the signal during the period TW of the segment W analysed.

Each analyser $A_1 \ldots A_n$ may advantageously be constituted by a programmed microprocessor provided with two buffer memories or buffers, each of which has a capacity sufficient to store the number of samples of signals corresponding to the duration TW of the segment W. The two buffers are used alternately, one for storing the fresh input data and the other the results of the analysis to be supplied at the output as the vector V.

The segments $W_1 \ldots W_n$ to be sent to the individual analysers $A_1 \ldots A_n$ are defined by a logic circuit 12 controlled by the timer 9 and adapted to send in sequence to the analysers $A_1 \ldots A_n$ the segments $W_1 \ldots W_n$, offset and partially overlapping in time, that is spaced by a time TI (FIG. 2) equal to the ratio between the duration TW and the number of analysers $A_1 \ldots A_n$ (FIG. 1). Therefore, each of the analysers $A_1 \ldots A_n$ analyses the respective segments consecutively, and the various analysers $A_1 \ldots A_n$ analyse segments $W_1 \ldots W_n$ which partially overlap in time. In other words, each phonetic portion or section of duration TI, a fraction of the duration of a segment TW, is analysed simultaneously by all the analysers $A_1 \ldots A_n$, as is clear from the diagram of FIG. 2, in which the sequence of the segments W is represented on the assumption that the unit 1 comprises three analysers $A_1$, $A_2$, $A_3$.

The recognition apparatus further comprises a comparison unit 13 comprising a plurality of comparators $C_1, C_2 \ldots C_m$, each adapted to compare a vector V generated by one of the analysers $A_1 \ldots A_n$ with a respective reference vector $V_1, V_2 \ldots V_m$ stored by the comparator and representing a corresponding reference phoneme. The vectors $V_1, V_2 \ldots V_m$ can be derived from the voice of the speaker to give rise to a "speaker-dependent" system or can be representative of average situations to give rise to a "speakerindependent" apparatus. Naturally, the reliability of recognition will be better in the first case than to the second. The result of each comparison is the distance D between the vector relating to the phonetic segment analysed and the corresponding reference vector, the distance being calculated as the sum of the absolute values of the differences between the pairs of coefficients of reflection of the two vectors. Between the analysers $A_1 \ldots A_n$ and the comparators $C_1 \ldots C_m$ there is disposed a scanner 14 which receives in sequence as input the vectors V and the values EN and, as output, sends each vector V in parallel to all the comparators $C_1 \ldots C_m$, while the successive values EN are stored in a buffer 16. More particularly, the vector generated by the analyser $A_1$ is simultaneously sent by the scanner 14 to all the comparators $C_1 \ldots C_m$ to be compared with the relevant reference vectors $V_1 \ldots V_m$. Each comparator $C_1 \ldots C_m$ thus measures the distance of the vector received from $A_1$ with respect to the relevant reference vector, which is constant for each comparator. Then the comparators $C_1 \ldots C_m$ compare the vector generated by the analyser $A_2$ and so on. The whole of the outputs of the comparators $C_1, C_2 \ldots C_m$ represents a vector D of m numbers, each of which represents the distance of the last segment W analysed with respect to the m reference phonemes.

The outputs of the comparators $C_1, C_2 \ldots C_m$ and of the buffer 16 are connected to a phonetic recognition unit 17 adapted to select the reference phoneme most similar to that analysed. More particularly, the recognition unit 17 is constituted by a programmed microcomputer provided with a buffer memory 18 in which the unit 17 causes the output of the comparison unit 13 and of the buffer 16 to be recorded with a periodicity TI determined by the timer 9. The buffer 18 is therefore adapted to store the vectors D and the values EN relating to a predetermined number X of last segments W analysed. The recognition unit 17 is programmed so as to analyse with the same periodicity TI the vector D relating to the last segment W analysed, which is stored in the buffer 18, to select the reference phoneme most similar to that which has generated the vector D. In practice, the unit 17 selects from among the m reference phonemes the phoneme FY which shows the minimum distance d from the phoneme of the segment i.e. the phoneme FY having the minimum of the values forming the vector D. The selected phomeme FY is defined by a code Y. Therefore, the segment W is represented by the code Y of the selected reference phomeme and by a code P representing the merit value of the recognition, constituted by the complement to a predetermined value of the aforesaid distance d.

Moreover, the recognition unit 17 is adapted to emit a code EN' corresponding to the power signal value EN and representing the energy level of the segment w analysed. Finally, the unit 17 is programmed so as to compare the last X vectors D in the buffer 18 to establish whether the recognition is stable or not, that is to say whether in the last X segments the comparison with the reference phonemes has always led to the same choice. In the positive case, the unit 17 emits a code of a binary value ST indicative of the stability.

Figure 3:
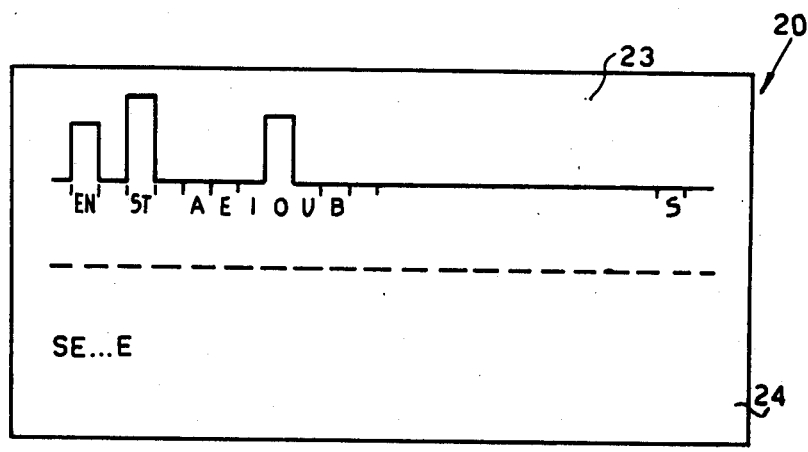
FIG. 3 is a diagram of the histogram generated on the monitor of the apparatus of FIG. 1.

The recognition apparatus further comprises a control unit 19 for a monitor 20 constituted by a cathode ray tube. More particularly, the unit 19 is adapted to receive from the recognition unit 17 the codes Y, P, EN' and ST, to provide on the monitor 20 the visual display of a histogram representing the said codes, in real time, along with the analysis of the phonetic segment itself. The histogram is visually displayed substantially in the upper half 23 of the monitor 20 and comprises a series of columns as indicated in FIG. 3. In this histogram, the first column represents the analogue value of the energy EN; the second represents the stability ST and can assume only two values (high if there is stability, zero if there is no stability); the following columns each correspond to one of the comparison phonemes and are all at zero level except that corresponding to the recognition phoneme FY, the height of which represents the merit value P in analogue form.

Below the various columns on the screen of the monitor 20 there are permanently indicated the significances of the columns. The various reference phonemes FY are indicated in the form of letters of the alphabet (for example, vowels) and of syllables of words. Alternatively, the number of phonemes recognisable could be changed, while visual display of the significance of the columns could be controlled by the same control unit 19 (FIG. 1), instead of being permanently indicated on the monitor 20.

To generate the desired histographic image on the monitor 20, the unit 19 commands a horizontal deflection of the beam, the deflection being linear and synchronised with the instant at which he unit 19 receives a block of information from the recognition unit 17, whereby this deflection is in synchronization with the time interval TI. Via a digital-to-analogue converter 21, the unit 19 then sends the signal which controls the vertical deflection in synchronization with the horizontal scanning generated by said horizontal deflection, as it will be described in more detail later.

Finally, the apparatus comprises a lexical recognition logic unit 22 essentially comprising a suitably programmed microcomputer and a memory in which are recorded the phonetic descriptions, suitably coded, of the lexicon or vocabulary, that is, the words that the apparatus can recognise, associated with the respective codes for the alphabetic representation of the same words. The lexical recognition unit 22 is adapted to receive in parallel with the control unit 19 each item of information which is output from the phonetic recognition unit 17 to store temporarily the data of a sequence of phonemes FY as they are recognised. Moreover, the unit 22 receives each time of information which is output from the scanner 14 to store also the sequence of vectors V actually corresponding to the analysed phonetic signals.

The lexical recognition unit 22 is adapted to compare the contents of the stores vocabulary with the sequence of phonemes FY which is received by the phonetic recognition unit 17 in order to effect a linking together and recognise a word, or part of a word, when the respective phonemes correspond to a group of phonemes FY of the sequence. If the correspondence of the sequence of the phonemes FY recognised with a word, or part of it, is not complete, for example an ambiguity of recognition is found, the unit 22 makes use of the vectors V received directly from the scanner 14, by taking into consideration other reference phonemes similar to that recognised by the recognition unit 17.

The result of the operation of the unit 22 consists in controlling the monitor 20 to display visually, for example in the lower part 24 of the screen, the words, or parts of them, recognised in alphabetic form, and to display visually a series of dots for portions in which there is no certain word recognition.

The apparatus operates in the following manner:

The apparatus provides two levels of recognition logic, phonetic and lexical.

Phonetic recognition takes place in real time and generates a reaction visible to the operator, this being also in real time.

The phonetic signal originating from the speaker which is picked up by the microphone 5 (FIG. 1) is amplified by the amplifier 6 and filtered by the filters 7. The signal filtered in this way is then sampled at high frequency by the sampling unit 8 and converted into digital signals by the converter 10. These values are received by the logic circuit 12, which creates a series of segments w of these signal of duration TW (FIG. 2) comprising a high number of sampled signals. By way of example, since the average duration of a phoneme is of the order of 100 msec, considering the apparatus equipped with only three analysers, $A_1$, $A_2$, $A_3$, the duration TW may be chosen to be 30 msec, while the sampling may take place at 18,000 Hz.

The successive segments $W_1$, $W_2$, $W_3$, $W_4$ . . . are spaced by a time TI equal to the ratio between the duration TW and the number of analysers, as a result of which we have TI=10 msec. The circuit 12 (FIG. 1) distributes the successive segments W to the analysers $A_1$, $A_2$ . . . which therefore operate on segments which are offset and overlapping as shown in FIG. 2. Each analyser $A_1$, $A_2$ . . . takes a time TA for analysing the corresponding segment, for the purpose of which, at the instants indicated by the graph 25 of FIG. 2, it supplies as output the result of the analysis, that is the coefficients of reflection constituting the respective vector V and the relative value EN of the average power of the sound signal.

Consequently, each analyser $A_1$, $A_2$ . . . supplies the results of the analysis on consecutive, but not overlapping, segments, with a delay TA with respect to the end of each segment.

As is apparent from the diagram of FIG. 2, the vectors V and the values EN are available at intervals of time equal to TI. The successive vectors V are selected in sequence by the scanner 14 and then sent in parallel to the m comparators $C_1$ . . . $C_m$, while t he value of EN is stored in the suitable buffer 16. The m comparators $C_1$ . . . $C_m$ then measure simultaneously, in the period indicatd by the graph 26 of FIG. 2, the distance between the vector V representative of the last sound segment analysed and m vectors $V_1$ . . . $V_m$ representative of as many reference phonemes recorded in them, defining as output from the comparison unit 13, at the instants indicated by the graph 27 in FIG. 2, the vector D of m numbers which represent the distance of the last segment analysed from the m reference phonemes. With the periodicity TI, the vectors D and the contents of the buffer 16 (FIG. 1) are acquired by the phonetic recognition unit 17, which causes the vectors D and the values EN relating to the X last segments analysed to be stored in the memory 18. Then, on the basis of the examination of the last vector D in the recognition unit 17, the reference phoneme FY most similar to the last segment analysed is recognised.

On the other hand, by comparing the last X vectors D in the memory 18 in the unit 17, it is established whether there is stability of recognition. At intervals of time equal to TI, the recognition unit 17 then sends the signals EN, Y, P, ST to the control unit 19 and the lexical recognition unit 22. Through the converter 21, the unit 19 controls the monitor 20 to generate a corresponding histogram of the type indicated in the upper part of FIG. 3, in which the phoneme recognised is the letter "O". More particularly, with respect to the beginning of the horizontal scanning, the positions corresponding to the histograms EN and St are reached after corresponding fixed time intervals and therefore the unit 19 sends the commands of vertical deflection after said fixed intervals. The time for reaching the position corresponding to the recognised phoneme is derived by the unit 19 from a table recorded in a ROM. For example, this table supplies the information that the phoneme "O" is reached upon a corresponding time interval TO; the phoneme "A" is reached upon a time interval TA and so on. The height of the phoneme histogram is proportional to the value of the code P and therefore it is as high as small is the distance of the recognised phoneme. This histogram can thus be constantly observed by the speaker, who receives in real time a visible indication of the phonetic recognition effected by the apparatus, in times congruent with the speaker's natural speed of articulation of a word. More particularly, if the speaker notices that a phoneme recognised is not the one that he intended to pronounce, he can adapt his pronunciation so as to bring it closer to the reference phonemes. Moreover, if he finds that the level indicated by the column EN of the histogram is low, he can raise his tone of voice. Finally, the column ST of the histogram supplies the speaker with the indication that the recognition has occurred without ambiguity and that it is added to the sequence of phonemes already accepted by the lexical recognition unit 22. Vice versa, absence of the column ST can indicate that the speaker's speed is not suited to the speed of analysis of the apparatus, for which reason he can suitably adapt his speaking speed.

It is clear that the apparatus described is purely an example of one possible method of recognition which gives the speaker a direct sensation of how his talk is recognised. Obviously, the phonetic recognition logic described is not equally suitable for all phonemes. More pariculary, it is more suitable for phonemes like the vowels, the nasal consonants and the fricatives (such as f, s, sc) which can be sustained in time, while it appears less suitable for recognising the explosive consonants (such as p, k, t, d) one with respect to the other. In order to ensure recognition of these consonants, the number of comparators $C_1$, $C_2$ . . . can be increased and adapted to the number of phonemes which can be coped with by the speaker and then recognised by the apparatus.

In contrast to phonetic recognition, lexical recognition does not take place in real time, but begins after the speaker has completed the pronunciation of the words to be recognised.

For lexical recognition, the lexical recognition unit 22 receives both the information which is output from the phonetic recognition unit 17 and all the information which is output from the scanner 14. The unit 22 therefore has at its disposal a sequence of codes which corresponds to the sequence of phonemes FY which are recognised little by little by the unit 17 and also has at its disposal a richer sequence of information originating from the scanner 14. The recognition unit 22 then links a sequence of phonemes together and first compares the contents of its vocabulary with the sequence of information received from the unit 17.

Correspondence between a portion of this sequence and an element of the lexicon allows the unit 22 to recognise a word and control the monitor 20 for the corresponding alphabetical visual display. To the degree in which the speaker has succeeded in adapting himself to the reactions of the apparatus, the sequence generated by the unit 17 will constitute a reliable information basis. This cannot be complete, however, because the phonetic recognition in real time is incomplete: for example, it cannot distinguish explosive sounds one with respect to the other. Where there are ambiguities of interpretation, the recognition logic in the unit 22 links together and compares with its vocabulary, vectors V received directly from the scanner 14, distinguishing the similar phonemes in this way from one another.

Therefore, the unit 22 also sends to the speaker through the medium of the monitor 20 a reaction indicating the sequence of phonemes received and a graphic representation of the word recognised. In order to give a clear idea, in the case of the Italian word "sette" (i.e. "seven") the sequence of phonemes which are recognised will be S E .. E (where the dots are representative of the silence which typically precedes the explosives, as indicated in FIG. 3. With the aid of the lexicon and of the data received from the scanner 14, on the other hand, the complete written word, tat is "SETTE", can be obtained. FIG. 3 illustrates the representation of SE..E on the lower half of the screen. This is a different example from recognition of the phoneme "O" shown for the upper half.

It is therefore clear that the apparatus described is specifically conceived to generate the desired reactions in real time, that is to say in a time shorter than the duration of an average vowel phoneme (about 100 msec) and that the vocal signal is treated without a break in continuity. The information passes through a series of logic units, each of which performs a function which can be carried out with the technology described, complying with the requirements of time indicated in the diagram of FIG. 2.

It is to be noted that it is possible to utilize other recognition procedures associated with other logical structures compatible with the basic idea of a reaction in real time to the speaker.

Finally, it is obvious that various modifications and improvements can be made in the specific apparatus described without departing from the scope of the invention. For example, some of the indications given by the monitor 20 could be provided by other visible means or optical indicators. The alphabetical representation of the words, controlled by the unit 22, may moreover be given by a printer, while the unit 22 could collect the vectors V directly from the analysers of the unit 11 instead of from the scanner.

I claim:

1. A method for the phonetic recognition of words spoken by a speaker comprising the folowing steps: periodically analysing a speech portion to obtain at least one speech vector,
   comparing said vector with a plurality of reference vectors each one representing a corresponding reference phoneme,
   selecting the reference phoneme represented by the reference vector of said plurality most similar to said speech vector,
   generating a merit code corresponding to the degree of similarity of the speech vector with the reference vector representing the selected reference phoneme,
   generating a phoneme code indicative of the selected reference phoneme,
   generating a stability signal in response to the selection of the same reference phoneme in at least two successive analyses, and
   displaying in real time on a monitor screen visible indications of said stability signal, of said phoneme code and of said merit code, whereby said indications continuously monitor the correspondence between the speaker's pronunciation and the pronunciation corresponding to reference phonemes.

2. Apparatus for the phonetic recognition of words spoken by a speaker, comprising converting means for converting speech signals into digital form, analysis means for analysing the converted speech signals for generating at least one corresponding speech vector, comparing means for comparing the speech vector so generated with each of the plurality of reference vectors each one representing a corresponding reference phoneme, recognition means responsive to the output of said comparison means to select the reference phoneme represented by the reference vector of said plurality most similar to the analysed speech vector, wherein said recognition means are adapted to generate a phoneme code indicative of the selected reference phoneme and a merit code corresponding to the degree of similarity of the speech vector with the reference vector representing the selected reference phoneme, said recognition means being also adapted to generate a stability signal representing the stability of the recognition in response to the selection of the same reference phoneme in at least two successive analyses, a monitor screen, and control means for generating in real time on said monitor screen a visible display of the code of the selected phoneme, in association with a visible, indication of said merit code and said stability signal.

3. Apparatus according to claim 2, characterised in that the said analysis means (11) comprises a plurality of analysers ($A_1, A_2 \ldots A_n$) adapted to receive phonetic segments (W) in digitally encoded form, the various analysers commencing analysis in sequence at times separated by the ratio (TI) between the said duration (TW) and the number of analysers, to analyse phonetic portions (W) partially overlapping in time and to generate a corresponding series of vectors (V), and in that the said comparison means comprise a plurality of comparators ($C_1, C_2 \ldots C_m$) each adapted to compare a respective reference vector of said plurality with the speech vector (V) supplied by the said analysers, each one of said comparators ($C_1, C_2 \ldots C_m$) comprising means adapted to calculate the distance of a speech vector (V) from a respective reference vector, said recognition means (17) being adapted to select the reference phoneme (FY) corresponding to the reference vector with the minimum distance from said speech vector (V) to store the value of the minimum distance for a predetermined number of successive selections and to generate said merit code (P) as the code of a value corresponding to the complement to a predetermined value of the stored minimum distance.

4. Apparatus according to claim 3, characterised in that the said recognition means (17) generate an energy signal corresponding to the average energy of the phonetic segment (W) analysed, said control means (19) causing said monitor screen to generate in a predetermined position a histogram corresponding to said energy signal.

5. Apparatus according to claim 2, characterised by lexical recognition means (22) adapted to compare a series of successive recognised phonemes (FY) with the words of a vocabulary recorded in a store to recognise words, and in that a portion of said monitor screen is controlled by the said lexical recognition means (22), to display in letters the recognised words.

6. Apparatus according to claim 2, wherein said monitor screen normally shows the reference phonemes in letters or syllables, said control means controlling said monitor screen to generate in correspondence with the letter or syllable of the selected reference phoneme (FY) an histogram of said merit code, whereby the speaker can check in real time whether the word pronounced is correctly recognised by the apparatus.

* * * * *